March 3, 1964 J. E. BOONE ETAL 3,123,675
FREQUENCY SELECTIVE SIGNALLING SYSTEM
Filed Nov. 1, 1962
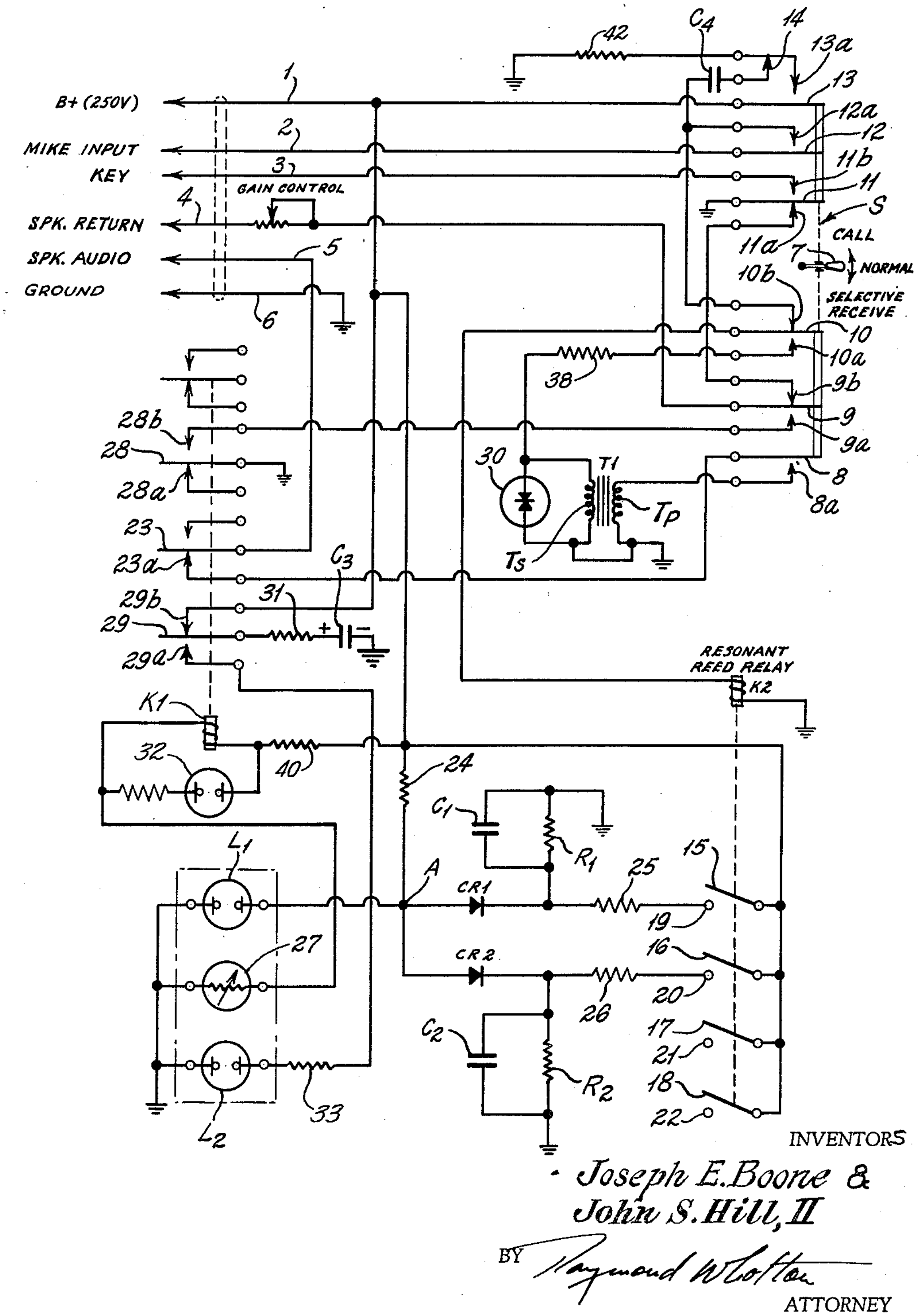
INVENTORS
Joseph E. Boone &
John S. Hill, II
BY Raymond W. Colton
ATTORNEY

United States Patent Office 3,123,675

Patented Mar. 3, 1964

3,123,675

FREQUENCY SELECTIVE SIGNALLING SYSTEM

Joseph E. Boone, Ferndale, Md., and John S. Hill II, Raleigh, N.C., assignors to Metrotek Electronics, Inc., a corporation of North Carolina Filed Nov. 1, 1962, Ser. No. 234,674
11 Claims. (Cl. 179—87)

This invention relates to a frequency selective signal calling and receiving system and more particularly to such a system utilizing a two-tone frequency for coding and decoding the signals.

The device of this invention, while not specifically limited thereto, has particular utility as a selective calling and receiving device in any citizen's band or commercial two-way radio-phone communications system and its use avoids the necessity for continuous monitoring by an operator at each station.

In the prior art, the selective calling and receiving equipment usually provided at each station is relatively complex, costly and power consuming. By this invention, such selective calling and receiving equipment can be provided at low cost, is rugged, uses no tubes or transistors, consumes very little power in its standby condition and is highly selective to received calling signals, thus avoiding false warnings. A distinctive feature of this invention resides in the novel arrangement for maintaining the warning signal at the called station operative for a predetermined time period after the initial reception of the calling signal and for automatically rendering the called station non-responsive to further calling signals and to receive a message during the period. It is a further distinctive feature of the invention that the means responsive to preselcted calling signals may also be utilized for transmitting such signals.

It is therefore an object of this invention to provide a calling signal encoder and decoder between stations in a two-way communications system which is highly selective in operation.

It is a further object of this invention to provide a calling signal decoder at a station in a two-way communication system operative to instantly provide an alert signal for a predetermined period of time.

Another object of the invention is to provide a calling signal decoder at a station in a two-way communication system which becomes inoperative to receive other calling signals for a period of time after the initial reception of desired calling signals and for controlling conditioning means for the station to receive messages within the period.

Other objects and advantages of this invention will become apparent from the following description when read in the light of the schematic shown in the drawing.

A plurality of leads designated by reference numerals 1 to 6 are connected to the respective terminals of a transceiver. The legends associated with the leads indicate the terminals of the transceiver to which they are connected. A multipole two-way switch S is provided for selectively conditioning the circuit shown on the drawing to generate a calling signal and to apply it to the microphone input of the transmitter circuit of the transceiver and to condition the circuit for response to selected calling signals to provide an alerting signal. An operating handle 7 is arranged for moving the switch from a "normal" or intermediate position to either an upper "Call" position or a lower "Selective Receive" position for selectively conditioning the circuit for the above purposes.

In the "normal" or monitoring position of the switch as shown in the drawing, the pairs of contacts 9 and 9*b*, 10 and 10*b*, 11 and 11*a*, 13*a* and 14 are normally engaged. In this position of the switch, the speaker of the transceiver is normally operative to reproduce the incoming message, its ground return lead 4 being connected to ground through normally engaged contacts 9, 9*b* and 11*a*, 11.

The calling signal coding arrangement of this invention includes vibratile reeds 15, 16, 17 and 18 which are tuned to resonance at respectively different individual frequencies. As one example, the reeds may be tuned to resonate at respective frequencies of 280.8, 313, 349 and 389 c.p.s. For the purposes of this invention, only two of the reeds are utilized for decoding the received calling signals so that six different combinations of two tone frequencies are available. Vibrations of the reeds are initiated by energization of the winding of relay K2 designated as "Resonant Reed Relay." In the calling mode of operation, the reeds are set into low amplitude vibrations at their natural frequencies when the winding of the relay is momentarily excited by a transient voltage. Such vibrations will generate in the winding electrical signals containing the frequencies to which the reeds are tuned, the output from the winding being applied through certain contacts of the switch S to the microphone input of the transmitter circuit of the transceiver.

In the "selective receive mode," when the switch S is in its lowermost position, the winding of relay K2 is connected through certain of the engaged switch contacts to the audio output terminals of the transceiver. The simultaneous presence in the received audio signals of two frequencies corresponding to those of a pair of selected reeds, will cause sufficient vibrations of these reeds to initiate operation of a circuit for energizing an alerting signal at the station for a predetermined period of time following initial reception of the selected calling signal. The transceiver will also be conditioned during this period for receiving incoming messages while the resonant reed relay will be rendered insensitive to further calling signals during this period.

One terminal of the winding of relay K2 is connected to ground while the other terminal is connected to movable contact 10 of the switch S so that it is not energized when the switch is in its monitoring position shown in the drawing. The audio output signals from the transceiver appearing on lead 5 are applied through the normally closed contacts 23, 23*a* of a relay K1 to the movable contact 8 of the switch S. When the switch is moved to its lowermost position, contacts 8 and 8*a* engage to apply the received audio signals to the primary winding $T_p$ of a step-up transformer T1. One terminal of the secondary winding $T_s$ of the transformer is grounded while its other terminal is connected through a resistor 38 to the now engaged contacts 10 and 10*a* to the other terminal of the winding of relay K2. Also connected across the secondary of the transformer is a selenium voltage limiting device 30 such as for example a "thyrector," for limiting the voltage applied to the winding of the relay K2 to a predetermined value. When the calling signals of the selected frequencies are present on the lead 5, the resonant reed relay K2 is energized to cause high amplitude vibrations of the reeds.

The reeds may be of magnetic material or non-magnetic material provided with magnetic portions and with conductive portions thereon capable of closing a conductive path between lead 1, to which they are connected at one end in common, and the respective contacts 19 through 22 from which they are normally disengaged. The lead 1 extends from a source of voltage provided at the transceiver and which has its negative terminal grounded. Connected in parallel through a resistor 24 to the lead 1, is a pair of bleeder circuits. One of these bleeder circuits comprises a forwardly biased diode CR1 in series with a resistor R1 shunted by a condenser C1 and forming an integrating circuit. The other of the bleeder circuits is similar and includes forwardly biased diode CR2 in series with the parallel combination of resistor R2 and condenser C2. The cathodes of the diodes are respectively connected through resistors 25 and 26, to selected terminals 19 and 20. The network including the resistances 24, R1, R2, diodes CR1, CR2 and condensers C1, C2 forms a diode AND gate circuit which opens when calling signals of two selected frequencies are simultaneously present on the lead 5.

Also connected between the lead 1 and ground through a current limiting resistor 40, is a relay K1 in series with a photosensitive device 27, such as a photo-resistive element. Of the contacts controlled by the relay K1, contacts 28 and 28*a*, 23 and 23*a*, 29 and 29*b* are normally engaged in the unenergized condition of the winding of the relay. A glow lamp or neon tube L1, in position to illuminate the photosensitive device 27 when fired, is connected between ground and the junction A of the anodes of the diodes CR1 and CR2 with the resistance 24. In the condition of the circuit as shown in the drawing, with the reeds disengaged from the contacts 19 and 20, the potential at point A is insufficient to fire the tube L1. As a consequence, the resistance of the photosensitive device L1 remains high enough to prevent energization of the winding of relay K1. A second glow lamp of neon tube L2 is positioned, when fired, to illuminate photoresponsive device 27 and is connected between ground and contact 29*a* of the relay K1 through a limiting resistor 33. A condenser C3 is charged through resistor 31 and normally closed contacts 29 and 29*b* from the lead 1 connected to the voltage supply. Upon energization of relay K1 contact 29 disengages contact 29*b* and engages contact 29*a* whereupon the condenser C3 discharges through the lamp L2 to fire it. A warning indicator 32 in the form of a light, buzzer or both is connected across the winding of relay K1 and is energized simultaneously therewith.

In operation, when the switch S is moved to its lowermost position, which is the "selective receive" position, contacts 8 and 8*a* engage to apply the audio output signals from the transceiver which appear on lead 5 across the primary T*p* of the transformer T1 through the normally engaged contacts 23, 23*a* of relay K1 which is normally deenergized. At the same time the speaker return lead to ground is opened by breaking of the contacts 9 and 9*b* and transfers the lead 4 through engagement of contacts 9 and 9*a* to a normally open fixed contact 28*b* of relay K1, the movable contact 28 of which is grounded. Contacts 10 and 10*a* of the switch S close to connect the resonant reed relay K2 across the output secondary winding T*s* of transformer T1. If the received audio signals on lead 5 contain a two-tone burst having the frequencies to which reeds 15 and 16 are tuned, energization of the winding of relay K2 by these signals will cause the reeds to vibrate with sufficient amplitude to close the contacts 19 and 20. Thus the cathodes of CR1 and CR2 are biased sufficiently positive to cause a rise in potential at point A sufficient to fire the tube L1 to illuminate the photoresponsive device 27 and decrease its resistance. This will permit sufficient current flow through the winding of relay K1 to energize it to move the contacts 23, 28 and 29 upwardly in the drawing, away from the respective contacts 23*a*, 28*a* and 29*a* and into engagement with the respective contacts 28*b* and 29*b*. Opening of contacts 23 and 23*a* removes the audio input from the primary of transformer T1, deenergizing the relay K2. The lamp or tube L1 is extinguished since the reeds do not then engage the contacts 19 and 20. However, closure of contacts 29 and 29*a* of the relay K1 permits the condenser C3 to discharge through the resistance 31 and 33 and the lamp L2 to illuminate the latter. The time period, in which the condenser is discharged to maintain the lamp L2 illuminated, is about 10 seconds but may be varied by changing the constants of the circuit. When the lamp L2 extinguishes after the charge on the condenser is substantially dissipated, the photosensitive device returns to its high resistance state and relay K1 is deenergized, whereby the contacts return to their conditions shown in the drawing. During conduction of the photosensitive element 27 the warning light such as 32 or a buzzer or both are energized.

In the calling mode of the device, the switch S is moved to its uppermost position to break contacts 11, 11*a*, thus opening the speaker return to ground, disabling the speaker so that no audio feedback therefrom to the microphone occurs. The movable contact 11 connected to ground, in turn engages contact 11*b* connected with lead 3 for keying the transmitter of the transceiver into operation. The contact 13*a* is also connected to ground through a resistor 42. The microphone input lead 3 is connected to the winding of resonant reed relay K2 for transmitting the calling signals generated thereby by closure of contacts 12 and 12*a*. The contacts 13, 13*a* and 14 form a make-before-break switching arrangement such that closure of contacts 13, 13*a* followed by opening of contacts 13*a*, 14 applies a transient voltage from the lead 1 to the winding of resonant reed relay K2 through condenser C4 and normally closed contacts 10, 10*b*. The transient voltage thus applied is sufficient to initiate vibrations of the reeds 15 and 16 and they will vibrate at the frequencies to which they are tuned. The vibrating reeds will induce currents in the winding of the relay K2 which will be coupled into the microphone input lead 2 through the engaged contacts 12, 12*a*.

From the above description it is apparent that a simple and rugged device is provided for automatically monitoring a transceiver whereby calling signals of two predetermined frequencies will provide a warning signal that the station is being called and prepare the station for receiving audio messages for a predetermined period of time. If the message is longer than the predetermined period, it is only necessary for the operator to move the switch S to its central position, designated as "normal." The same frequency determining unit which is used for responding to received calling signals can also be used for transmitting such signals. However, it is obvious that the device of this invention may be provided with means for selectively connecting the diode AND gate to any two of the terminals 19 to 22 so that each station of an intercommunication system utilizing the device, may be subject to call at two designated frequencies unique to that station and to call any other station in the system at any other of two frequencies designated for that station by highly damping the unselected reeds.

Having thus disclosed the invention with full particularity and the best mode of applying same, other modifications may occur to one skilled in the art without departing from the scope and spirit of the invention as defined by the appended claims.

We claim:

1. In an intercommunicating system having a plurality of stations including signal receiving means, at least one station having a device connected to the signal receiving means for receiving calling signals of a plurality of frequencies and including a plurality of normally open switches each responsive to a different predetermined frequency for closure thereof, a separate circuit energized by closure of each of the switches, a warning device, an AND gate rendered operative upon simultaneous energization of said circuits by closure of the switches in response to simultaneous reception of the plurality of different frequencies, means responsive to operation of the AND gate for energizing said warning device, switching means energized by operation of said AND gate for disconnecting the device for receiving calling signals from the signal receiving means, a timing circuit energized by operation of the AND gate for maintaining energization of the warning device and switching means for a predetermined period of time, said switching means including a relay, a light source energized only during the operative condition of the AND gate, a photoresponsive element controlling energization of the relay in response to light from the source, said timing circuit comprising a second light source, and means controlled by the relay when energized for energizing the second light source for a predetermined period of time for maintaining energization of the relay under control of the photoresponsive element in response to light from the second light source.

2. In an intercommunicating system having a plurality of stations including signal receiving means, at least one station having a device connected to the signal receiving means for receiving calling signals of a plurality of frequencies and including a plurality of normally open switches each responsive to a different predetermined frequency for closure thereof, a separate circuit energized by closure of each of the switches, a warning device, an AND gate rendered operative upon simultaneous energization of said circuits by closure of the switches in response to simultaneous reception of the plurality of different frequencies, means responsive to operation of the AND gate for energizing said warning device, said AND gate comprising a plurality of normally conducting parallel networks, and a source of potential and a resistance connected in series with said networks, said means for energizing the warning device being connected to the junction of the networks and series resistance and being non-responsive to the value of potential at the junction for energizing the warning device, said separate circuits respectively cooperating with said networks for rendering them non-conductive upon energization of said separate circuits by closure of the switches to increase the potential at the junction, when all of the networks are non-conducting, to a value at which the means for energizing the warning device becomes responsive.

3. In an intercommunicating system having a plurality of stations including signal receiving means, at least one station having a device connected to the signal receiving means for receiving calling signals of a plurality of frequencies and including a plurality of normally open switches each responsive to a different predetermined frequency for closure thereof, a separate circuit energized by closure of each of the switches, a warning device, an AND gate rendered operative upon simultaneous energization of said circuits by closure of the switches in response to simultaneous reception of the plurality of different frequencies, means responsive to operation of the AND gate for energizing said warning device, said AND gate comprising a plurality of parallel networks, and a source of potential and a resistance connected in series with said networks, each of said networks comprising a resistance and a normally conductive diode in series, said means for energizing the warning device being connected to the junction of the series resistance and the networks and non-responsive to the value of potential at said junction during conduction of the diodes for energizing the warning device, the separate circuits energized by closure of the switches cooperating with the respective diodes for biasing them to non-conduction to increase the potential at the junction, when all of the diodes are non-conducting, to a value at which the means for energizing the warning device becomes operative.

4. In an intercommunicating system having a plurality of stations including signal receiving means, at least one station having a device connected to the signal receiving means for receiving calling signals of a plurality of frequencies and including a plurality of normally open switches each responsive to a different predetermined frequency for closure thereof, a separate circuit energized by closure of each of the switches, a warning device, an AND gate rendered operative upon simultaneous energization of said circuits by closure of the switches in response to simultaneous reception of the plurality of different frequencies, means responsive to operation of the AND gate for energizing said warning device, said device for receiving calling signals of a plurality of different frequencies including a relay having a winding, and the switches comprising vibratile magnetic reeds tuned to resonate at respectively different frequencies upon energization of the winding at said frequencies for engaging relatively fixed contacts, signal transmission means at the station, a selective switch for disconnecting the relay winding from the signal receiving means and connecting it momentarily to a source of voltage to effect vibrations of the reeds at their resonant frequencies at insufficient amplitudes to engage the fixed contacts but to generate electrical signals in said winding at the frequencies of the vibrating reeds and to the transmission means.

5. A signalling system for cooperation with a transmitter, a receiver and a power supply, comprising a resonant reed relay having winding means, a plurality of resonant reeds having dissimilar natural frequencies magnetically coupled to said winding means; a gating circuit having contact means adapted to be engaged by said reeds, an input circuit connected to said contact means and an output circuit connected to a signal circuit; and switching means for selectively connecting said winding means with an output of said receiver for a first condition of operation and with said power supply and an input of said transmitter for a second condition of operation.

6. A signalling system as defined by claim 5 wherein said switching means connects said winding means with said power supply and transmitter input sequentially.

7. A signalling system as defined by claim 5 wherein said gating circuit is an AND gating circuit.

8. A signalling system as defined by claim 5 wherein said winding means is connected to said power supply momentarily prior to connection to said transmitter input.

9. A signalling system as defined by claim 5 wherein the natural frequencies of said reeds are in the audible range.

10. A signalling system as defined in claim 5 wherein said reeds engage separate contacts connected to said input circuit of said gating circuit.

11. A signalling system for cooperation with a transmitter, a receiver and a power supply, comprising a resonant reed relay having winding means and a resonant reed magnetically coupled to said winding means; a control circuit having contact means adapted to be engaged by said reed, an input circuit connected to said contact means and an output circuit connected to a signal circuit; and switching means for selectively connecting said winding means with an output of said receiver for a first condition of operation and with said power supply and an input of said transmitter for a second condition of operation.

References Cited in the file of this patent

UNITED STATES PATENTS

| | | |
|---|---|---|
| 2,524,300 | Taylor | Oct. 3, 1950 |
| 2,547,024 | Noble | Apr. 3, 1951 |
| 2,602,853 | Harrison | July 8, 1952 |
| 2,626,384 | Winkler | Jan. 20, 1953 |
| 2,968,801 | De Feo | Jan. 17, 1961 |
| 2,974,221 | Peth | Mar. 7, 1961 |
| 3,039,081 | Smith | June 12, 1962 |
| 3,066,201 | Beucher | Nov. 27, 1962 |